United States Patent Office 2,729,637
Patented Jan. 3, 1956

2,729,637

METHOD OF PRODUCING CYANURIC ACID

Howard S. Gable, Kansas City, Mo., and Glenn W. Kerr, Mission, Kans.; said Kerr assignor to said Gable No Drawing. Application June 29, 1953,
Serial No. 364,908

6 Claims. (Cl. 260—248)

This invention relates to cyanuric acid and more particularly to a novel method of producing cyanuric acid and obtaining a high yield thereof from cheaply available raw materials.

The objects of the invention are to provide a process of manufacturing cyanuric acid from urea and thionyl chloride; to provide a process of producing cyanuric acid wherein urea and thionyl chloride are reacted together; to provide a process for the manufacture of cyanuric acid wherein urea and thionyl chloride are reacted together to completion through an exothermic reaction beyond the stage of the formation of biuret; to prepare cyanuric acid by reacting together urea and thionyl chloride under reflux at a suitable temperature and for sufficient time until after completion of exothermic reaction, volatile products being evacuated during a portion of the reaction, and then subjecting the residue to water extractions and crystallizations to obtain a highly purified cyanuric acid; and to provide a process for the manufacture of cyanuric acid from available, relatively cheap raw materials whereby said production of cyanuric acid is economical and efficient.

We have found that when urea and thionyl chloride are heated together at a suitable temperature, continuation of the heat treatment will result in the reaction going into a second stage which is strongly exothermic. Although a number of investigators have studied the reaction between urea and thionyl chloride, until the present time, other products were obtained from the reaction. Moureau (Bull. Soc. Chem. 11 1069 (1894) claimed that when urea was heated with thionyl chloride it underwent dehydration to form cyanamid, but Werner (Chemistry of Urea, London, 92 (1923)) stated that urea is only slowly attacked by thionyl chloride under the conditions of Moureau and gives a yield of cyanamid of only 0.11% of the theoretical. Warren and Wilson (Ber. 68B 957–60 (1935)) found that thionyl chloride acted upon urea with the evolution of hydrogen chloride, sulphur dioxide and ammonium chloride and that the residue yielded biuret as the chief product. Werner and Werner (Sci. Proc. Royal Dublin Soc. 23 139 (1943)) repeated this and showed the yield of biuret to be in the order of only 10% of the theoretical with approximate equal molecular proportions of urea and thionyl chloride, the main products being ammonium chloride, ammonium cyanate and other decomposition products of cyanic acid. Haworth and Mann (J. Chem. Soc. 603 (1943)) found, however, that a yield of biuret amounting to 56% of the theoretical could be obtained by following a procedure of reacting urea with thionyl chloride, and under their conditions triuret is also formed. With larger proportions of thionyl chloride the yields of triuret were increased. These results have been confirmed by Werner and Gray (Sci. Proc. Royal Dublin Soc. 24 111 (1946)) and we have also verified these results.

We have discovered, however, that it is possible to carry the reaction between the urea and thionyl chloride into a second stage which is strongly exothermic, and when this has run its course the constitution of the reaction products is changed and the residue yields no biuret at all but 90 percent or better of the theoretical quantity of cyanuric acid based on urea, together with a large amount of ammonium chloride and a very small amount of elemental sulphur.

The thionyl chloride decomposes chiefly to sulphur dioxide, hydrogen chloride and sulphur chlorides, which are expelled from the reaction during the course of the reaction. Only a very small amount of secondary products is formed so that it is possible to easily recover the cyanuric acid as a highly purified material. It is believed that previous investigations, as above mentioned, indicate we have discovered an unexpected sequence of reaction that could not be predicted from said investigations. The reaction between urea and thionyl chloride may be represented by the following equation:

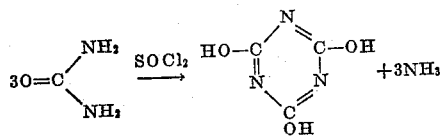

As an example of the process of manufacture of the cyanuric acid in accordance with the present invention, approximately twelve hundred (1200) grams of urea and eight hundred ninety (890) grams of thionyl chloride are heated together under reflux at the temperature of a water bath for approximately three and one-half (3½) hours, then for an additional one and one-half (1½) hours while the system is evacuated by a water pump or other suitable evacuating device to remove volatiles. During this period the urea is dissolved in the thionyl chloride and there is an evolution of sulphur dioxide and some hydrogen chloride. There is a weight loss of three hundred and forty-five (345) grams, two hundred (200) grams of which are lost during the first hour of heating. Temperature indications will show the reaction gradually becomes exothermic, and on continued heating the reaction becomes very vigorous with an evolution of dense red fumes of sulphur chlorides. When this vigorous reaction has subsided, a light, sulphur-colored, porous mass remains in the reactor, the residue remaining being approximately fifteen hundred eighteen (1518) grams, showing a further weight loss of two hundred twenty-seven (227) grams.

The residue is then subjected to repeated water extractions and crystallizations, which result in recovery of approximately seven hundred sixty (760) grams of cyanuric acid, six hundred thirty-five (635) grams of ammonium chloride and fifty-three (53) grams of elemental sulphur, the cyanuric acid being essentially chemically pure.

While the particular proportions of the urea and thionyl chloride may be varied, we prefer that the proportions be approximately four (4) parts by weight of the urea to three (3) parts by weight of thionyl chloride, and that said urea and thionyl chloride be reacted together under reflux at a temperature of approximately ninety (90) to one hundred (100) degrees C. for a period of approximately three and one-half (3½) hours, at which time the second stage of reaction or the exothermic reaction continues for an additional period of from one and one-half (1½) hours to two and one-half (2½) hours. This reaction goes beyond the stage of the formation of biuret and it is preferable that the reaction be continued to completion.

It is believed obvious we have provided a process for the manufacture of cyanuric acid from available, relatively cheap raw materials.

What we claim and desire to secure by Letters Patent is:

1. A process for the preparation of cyanuric acid consisting of, reacting urea and thionyl chloride together under reflux at a temperature of a water bath until after an exothermic reaction has taken place.

2. A process for the preparation of cyanuric acid consisting of, reacting together urea and thionyl chloride under reflux at a temperature of a water bath until exothermic reaction commences, continuing the reaction to completion through the exothermic stage and beyond the stage of the formation of biuret.

3. A process for the manufacture of cyanuric acid consisting of, reacting urea and thionyl chloride together under reflux at a temperature of approximately 90° to 100° C. until exothermic reaction starts, continuing the reaction through the exothermic stage, evacuating volatile products during the exothermic reaction to leave a residue, and subjecting the residue to repeated water extractions and crystallizations for recovery of the cyanuric acid.

4. A process for the manufacture of cyanuric acid consisting of, reacting together approximately four (4) parts by weight of urea and three (3) parts by weight of thionyl chloride under reflux at the temperature of a water bath until exothermic reaction commences, continuing the exothermic reaction until completion, evacuating volatile products during the exothermic reaction to leave a residue, and subjecting the residue to repeated water extractions and crystallizations for recovery of the cyanuric acid.

5. A process for the manufacture of cyanuric acid consisting of, reacting together approximately twelve hundred (1200) grams of urea and eight hundred ninety (890) grams of thionyl chloride under a reflux at a temperature of ninety (90) to one hundred (100) degrees C. for a period of approximately three and one-half (3½) hours, continuing the reaction for an additional period of one and one-half (1½) to two and one-half (2½) hours until after an exothermic reaction has taken place, and evacuating first the volatile products of sulphur dioxide and hydrogen chloride and then a mixture of sulphur chlorides during the reaction to leave in the reactor a solid porous mass consisting of cyanuric acid, ammonium chloride and elemental sulphur.

6. A process for the manufacture of cyanuric acid consisting of, reacting together urea and thionyl chloride under reflux at the temperature of a water bath until exothermic reaction commences, continuing the reaction until the formation of a residue, and subjecting the residue to repeated extractions and crystallizations for the recovery of the cyanuric acid.

No references cited.